United States Patent
Sides et al.

(10) Patent No.: US 6,722,311 B1
(45) Date of Patent: Apr. 20, 2004

(54) FIXED PLATFORM FEEDER FOR ANIMALS AND BIRDS

(75) Inventors: Paul B. Sides, San Antonio, TX (US); H. Dell Foster, Blanco, TX (US)

(73) Assignee: Texas Hunter Products, San Antonio, TX (US)

(*) Notice: Subject to any disclaimer, the term of this patent is extended or adjusted under 35 U.S.C. 154(b) by 0 days.

(21) Appl. No.: 10/366,416

(22) Filed: Feb. 14, 2003

(51) Int. Cl.[7] ................................................ A01K 5/00
(52) U.S. Cl. ................................... 119/52.1; 119/51.01
(58) Field of Search ........................... 119/51.01, 52.1, 119/52.4, 53

(56) References Cited

U.S. PATENT DOCUMENTS

| | | |
|---|---|---|
| 3,074,377 A | 1/1963 | Spencer |
| 4,318,364 A | 3/1982 | Rescherer |
| 4,538,548 A | 9/1985 | Page |
| 4,840,143 A * | 6/1989 | Simon ........................ 119/52.1 |
| 5,143,289 A | 9/1992 | Gresham et al. |
| 5,794,563 A | 8/1998 | Klepac |
| 5,819,687 A * | 10/1998 | Lister ........................ 119/52.1 |
| 5,992,349 A * | 11/1999 | Sachs ........................ 119/52.1 |
| 6,135,056 A * | 10/2000 | Kuo ........................ 119/51.11 |
| 6,199,509 B1 | 3/2001 | Mostyn et al. |
| 6,397,779 B1 * | 6/2002 | Bonne ........................ 119/51.01 |
| 6,477,981 B1 * | 11/2002 | Harper ........................ 119/52.4 |
| 6,481,376 B1 | 11/2002 | Finklea |
| 2002/0124804 A1 * | 9/2002 | Fransen et al. ............ 119/52.1 |

* cited by examiner

Primary Examiner—Charles T. Jordan
Assistant Examiner—Elizabeth Shaw
(74) Attorney, Agent, or Firm—Sughrue Mion, PLLC

(57) ABSTRACT

A static feeder system for supplying feed aggregate to animals and birds. A constant and controlled amount of protein pellets, grain, seeds, etc., is supplied to multiple feed stations within an environmentally protected bulk container. A bulk container is used as the primary storage hopper and appropriate cut-outs are made on the base periphery of the container equal to the number of feed stations desired. A single piece of material is inserted to provide the sealed walls and the base shape for each feed station on the drum periphery. The base absorbs and distributes the bulk load from the hopper and funnels it to the drum base. The base component and the multiple funnel component moldings to form a two component assembly which provides internally protected feed pockets that control the quantity and shape of the emerging feed aggregate flowing from the bulk container.

22 Claims, 3 Drawing Sheets

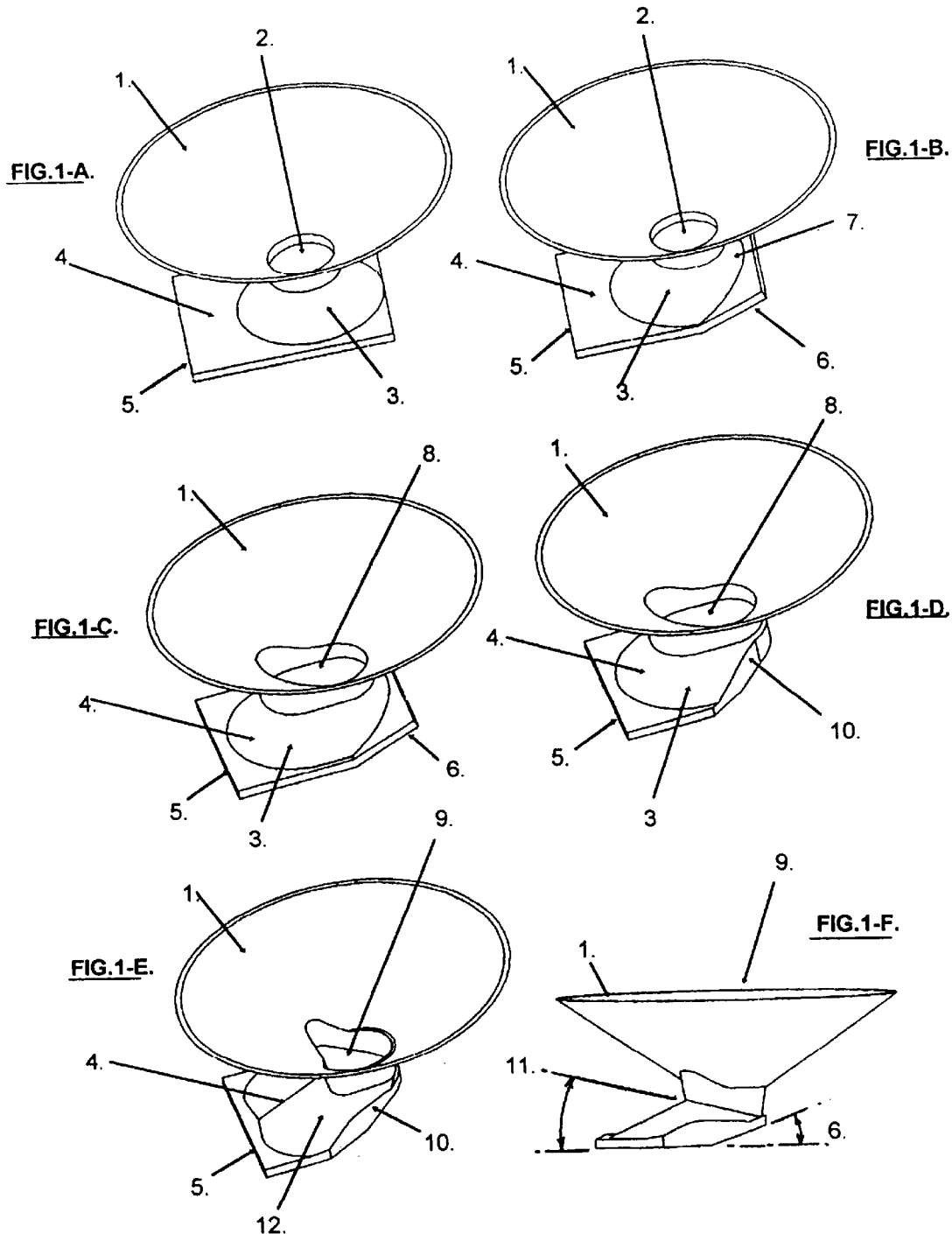

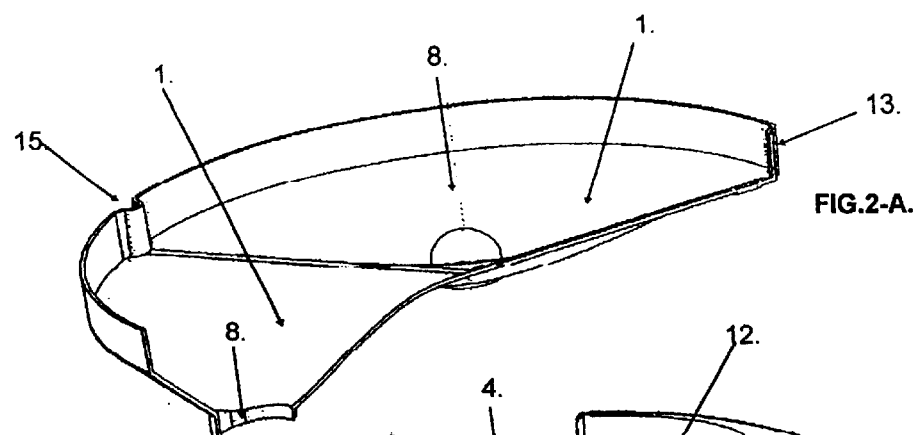
FIG.2-A.
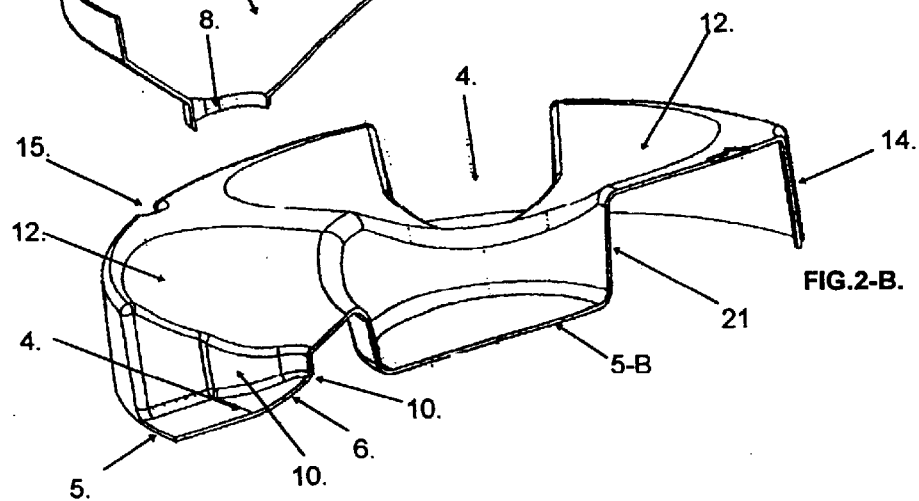
FIG.2-B.
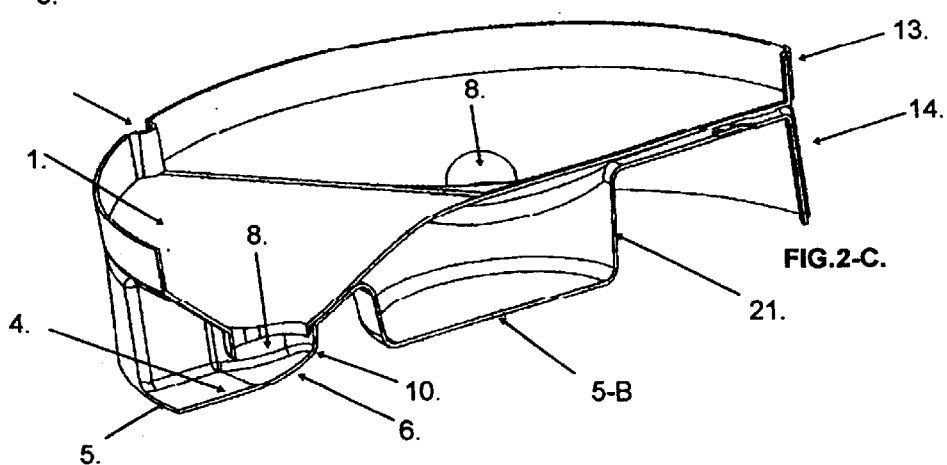
FIG.2-C.

FIXED PLATFORM FEEDER FOR ANIMALS AND BIRDS

TECHNICAL FIELD OF THE INVENTION

The present invention generally relates to a feeder system to provide feed aggregate to animals and birds. More particularly, the present invention relates to a multi-station gravitational static feeder that efficiently distributes feed aggregate to animals and birds. A system in accordance with the present invention continuously distributes feed aggregate that is easily accessible and also limits the amount of feed that becomes stagnant or is otherwise wasted.

BACKGROUND OF THE INVENTION

Grain, seed and protein pellet feeders are frequently used by ranchers, hunters and game keepers to provide a consistent supply of feed to animals and birds both domestic and wild. Such feeders can be active, in that they supply a set amount of feed on a timed basis using electric timers to control the feed rate and quantity from a bulk supply, or they can be static. Static feeders typically do not have a control mechanism and present the feed directly from the bulk container for consumption. A typical conventional feeder utilizes a funnel located under a supply hopper that terminates with a round opening for the feed aggregate to escape. A floor, or base, is positioned below the funnel opening and comprises the feed area. The feed aggregate spills through the opening onto the floor base and accumulates upwards in a conical shape until the aggregate restricts the opening and stops further flow of aggregate. As the feed is consumed from the cone stack, the feed cone collapses and frees the opening for additional feed flow until feed refills the base and restricts the opening again.

A major drawback in regard to conventional static feeders is that they do not protect and control the size and shape of the feed cone and housing to optimally present the feed for easy access or consumption. Poor control of the aggregate cone shape, to properly integrate with the surrounding feed station housing, causes build-up of unconsumed, and ultimately stagnant, feed. The stagnant feed is subject to moisture, rot and mold and, thus, will eventually be wasted. Further, conventional feeders do not account for different flow characteristics with respect to various shapes, sizes and textures of feed particulate. This creates a situation, for example when utilizing fine birdseed, where the feed overflows the feed area or platform, also creating waste. Also, larger aggregates, such as protein pellets, create cones that are smaller than the optimal feed area of the feeder and, thus, cannot be easily reached for consumption.

To address the above-mentioned issues, such as spillage and waste due to improper control of the size and shape of the feed cone and feed area, some conventional static feeders include a vertical lip in front of the feed station access opening. However, a lip or depression in the feed cone pocket traps water and other contamination, which causes rapid deterioration of the feed and, thus, also causes waste.

SUMMARY OF THE INVENTION

In accordance with the present invention, by controlling the shape and/or geometry of the cone stack, various types, sizes and weights of particulate feeds can be placed in the optimum position within the feeder for animal or bird consumption and also replenish the feed pocket as the current feed is consumed. According to one embodiment of the invention, this is accomplished by providing two vacuum-molded plastic base components.

According to one embodiment, the first of the two base components is a structural base designed to distribute the weight of the feed in the storage hopper and transfer it to the base of a primary container. The structural base also forms an enclosure around the feed cone to optimize the shape of the cone, eliminate "dead" zones and move the feed to the desired position for consumption. By forming a specifically shaped housing closed on all sides of the food cone, except the access opening of each feed station, the feed does not scatter, and is protected from rain, snow, etc., as well as from other forms of contamination. The additional friction on the feed particulate caused by the walls of the housing help control the feed flow so a depression or lip is not necessary on the floor in front of the access opening. This assures that no water or contamination will be retained in the feed area.

The second vacuum molded base component according to this embodiment is a single piece having a desired number of feed funnels and shaped orifices required for each feeder assembly. Each funnel has a smooth blended slope composed of spline curves sloping downward and blending in with the geometry of the shaped opening or orifice at its bottom. The geometry of the funnels and shaped orifice is designed to facilitate a smooth flow of feed particulate to the openings without obstructions. The geometry or shape of the funnel and orifice with its surrounding walls is designed to mate, or fit, within the structural base forming a unified assembly that places the feed particulate in a protected enclosure that is positioned for easy access by animals or birds through the station opening.

Positioning the feed particulate in the optimum accessible position is primarily a function of the orifice location on the funnel in relation to the container access opening. Controlling the shape of the feed particulate cone is a function of the geometry or shape of the orifice or opening and its angle to the base floor, together with the surrounding walls and floor design of the structural base component with which it is mated. It should be noted that shaping the geometry of the orifice or funnel opening will have a general effect on the shape of the particulate cone as a function of the cone height above the base floor. The shaping effect of the orifice opening will diminish with distance and is only effective with short cone lengths.

BRIEF DESCRIPTION OF THE DRAWINGS

The object and features of the present invention will become more readily apparent from the following detailed description of the preferred embodiments taken in conjunction with the accompanying drawings in which:

FIG. 1 consists of six views of the hopper funnel, feed cone and base floor assembly and the effect of implementing certain design functions;

FIG. 1-A illustrates the geometry or shape of the feed cone with a round funnel orifice and a flat base floor running parallel to the opening in accordance with the present invention;

FIG. 1-B illustrates the effect of adding an angular slope to the base floor just ahead of the center of the funnel opening in accordance with the present invention;

FIG. 1-C illustrates the effect of changing the shape of the orifice from a circular figure to an oval or elongating the opening towards the front in accordance with the present invention;

FIG. 1-D illustrates the effect of adding a shaped wall around the back of the feed cone and the subsequent feed particulate cone position in accordance with the present invention;

FIG. 1-E illustrates the shape of the feed particulate cone having an orifice with a triangular opening thereby filling out the sides of the feed station in accordance with the present invention;

FIG. 1-F illustrates the effect of moving the feed particulate cone forward by adding a cut to the orifice walls angled upward to the front of the feed station opening in accordance with the present invention;

FIG. 2 illustrates the two piece plastic vacuum molded base components sectioned too illustrate on embodiment of the present invention;

FIG. 2-A illustrates a sectioned single-piece multiple funnel component of the system in accordance with the present invention;

FIG. 2-B illustrates the sectioned single piece structural base component of the system in accordance with the present invention;

FIG. 2-C illustrates the two components mated together to form the multiple protein feed stations in accordance with the present invention;

DETAILED DESCRIPTION OF THE INVENTION

Figure 3:
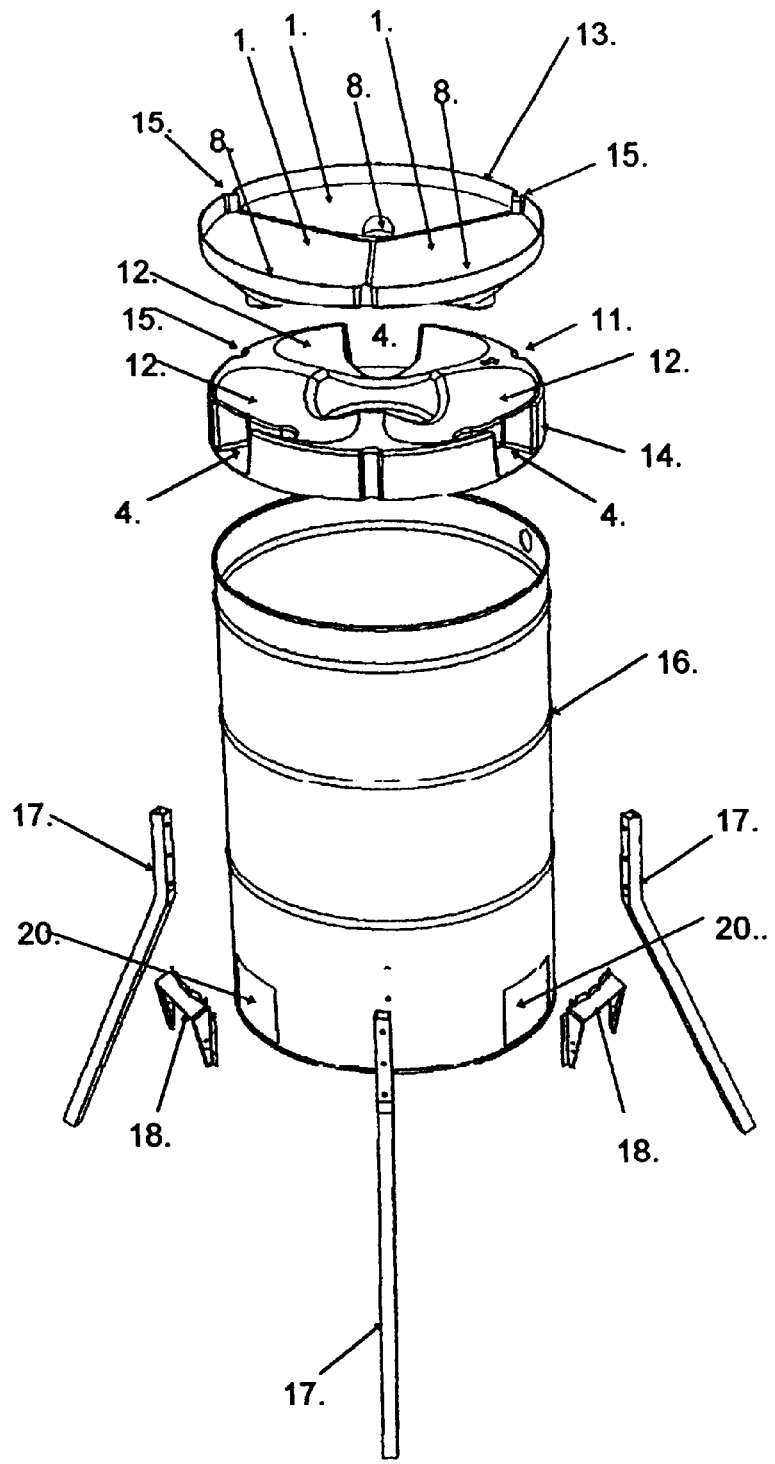
FIG. 3 illustrates a complete system in accordance with one embodiment of the present invention.

FIGS. 1–3 illustrate several embodiments of the invention. The disclosure of the selected embodiments does not limit the scope of applications or design defined by the principles as explained. Since a static bulk feeder does not use power devices or timers to control the quantity and rate of supply to the feed stations, a gravity principle is utilized as depicted in the embodiments described and illustrated. As shown in FIG. 1-A, a hopper funnel (1), directs the gravity fed feed particulate to an opening or orifice (2), located at the bottom of the funnel. The feed particulate flows through the opening to a base floor (4), located some distance below, and parallel to, the orifice (2). The feed particulate piles up forming a feed or particulate cone (3), until the feed restricts the orifice and stops the feed flow. As the feed is consumed from the cone stack, (3), the subsequent collapse of particulate frees the opening to additional flow until feed again piles up and restricts the opening (2). The feed cone formed, (3), must be in a position of unrestricted access for the animals or birds to retrieve the feed from the main feed station opening (20), shown in FIG. 3.

According to the embodiment shown in FIG. 1-A, the feed station opening (4) is optimized for deer and game birds and is approximately 4.5 inches high by 4.625 inches wide by 3.75 inches deep to the center of the funnel orifice (2). If the orifice were two inches in diameter, and parallel to the base floor at a distance of 1.1 inches from the floor (5), the feed aggregate would form a symmetrical cone at the base varying from 3.5 to 4.5 inches in diameter, depending on particulate size, shape and texture.

It should be noted that the vertical distance from the floor (5) to the funnel orifice (2) controls the volume of feed particulate required to restrict the orifice. The base-height ratio is determined by the desired width of the feed station opening or a base floor width of 4.625 inches. Therefore, according to the feeder shown in FIG. 1A, a base-height ratio equals approximately 0.240 to 1. A practical limit to minimize the depth of the vacuum molded components as shown in FIG. 2-A and FIG. 2-B, is a base-height ratio of from approximately 0.24 to 0.35.

FIG. 1-A illustrates an embodiment where the particulate cone (3) might be considered to be too far back for easy animal access and leaves the back of the particulate inaccessible and subject to stagnation. As shown by the embodiment of FIG. 1-B, raising the back of the base floor (5) by 20 to 30 degrees (6) from approximately 0.75 inches ahead of the orifice center reduces the volume (7) of inaccessible feed and moves the particulate cone slightly forward. Raising the back of the base floor (5) also facilitates forward sliding action of the back particulate to prevent stagnant areas.

An ideal position of the feed cone (3) provides the easiest access from the station opening (4) while avoiding the particulate spilling out when fine regular shaped particulate such as bird seed is used. It can be seen from FIG. 1-B, then, that under these conditions the particulate cone might still be too far back for optimum access. Moving the funnel (1) and orifice (2) forward would cause the funnel to inhibit access from the front and reduce the inside slope angle of the funnel (1).

Changing the geometry of the orifice (2) by elongating it towards the front by approximately 0.5 inch, or shaping it as shown by item (8) in FIG. 1-C, moves the feed cone forward to a more favorable position. Further enhancement by reducing the particulate volume per item (2) and improving the forward sliding action of the rear particulate is achieved by shaping the back side walls of the structural base (FIG. 2-B) around the orifice (8) as indicated by item (10) in the further embodiment shown in FIG. 1-D.

According to a further embodiment, additional changes to the geometry and shape of the particulate cone (3) can be implemented by forming a triangular opening of the funnel orifice (9) in FIG. 1-E or changing the angle (11) of the orifice in relation to the base floor (5), as shown in FIG. 1-F. A triangular orifice opening as indicated in FIG. 1-E item (9), will cause the particulate cone to fill the sides of the feed pocket (12) for a wider cone frontal area being presented for consumption. Shaping the orifice at an angle (11) to the base floor opening outward to the access opening (4), as shown in the embodiment of FIG. 1-F, will move the particulate cone forward and increase the frontal volume of feed.

As illustrated in the embodiments of FIGS. 1-A through 1-F, a vacuum formed structural base as shown in FIG. 2-B can be constructed. The structural base is formed from 3/16-inch thick sheet plastic with an average depth of 3.75 inches. The outer rim (14) is drafted outward to the bottom and dimensioned to fit the inside dimensions of the bulk hopper container (16). Bolt clearance areas (15) are molded into the periphery of the structural base by, for example 120 degree separation, to go around bolts that secure the legs (17) to the bulk container (16). The base floor (5) with its back angle (6) forms the feed pocket enclosure with the formed walls (10) to control the particulate cone feed shape (12) and position (4). From the center of the structural base, starting at a radius of approximately 7.8 inches at a angle of about 12 degrees, the base floor 5-B is drafted upwards to form a circular structural support wall (21).

The single-piece structural base of FIG. 2-B is formed at its top to the exact geometry of the bottom of the hopper funnels (1) of FIG. 2-A.

Located at the top of the structural base there is a single-piece multiple funnel component with three or more spline curved funnels (12) which terminate with the desired shaped orifices or openings (2), (8), (9) and (11). The combination of shaped orifices shown in FIGS. 1-A through 1-F in items (2), (8), (9), and (11) are described to show and explain the effect on the shape of the particulate cone only, and do not limit the scope of the invention to any shaped orifice or geometry or combinations of geometry to control the form of the particulate feed cone. The multiple funnel component of FIG. 2-A is vacuum molded from approximately 0.156 inch thick sheet plastic. The component is formed to an outward inclined outer rim (13), sized to the inside dimensions of the hopper or bulk container item (16). The outward drafted or inclined rim (13) assures a tight seal with the inside surfaces of the bulk container under the pressure and weight of the grain or particulate in the bulk hopper (16).

The funnels (12) are formed with downward blended spline curves, which form into the geometry of the orifice (2), (4), (8) or (9) at the base of the funnels (12). To assure smooth and steady flow of the feed particulate to the orifices, there are no flat or plane surfaces in the multiple funnel component shown in FIG. 2-A.

By mating the multiple funnel component (FIG. 2-A) with the structural base component (FIG. 2-B) the units form the feed pocket stations (4), (5), (6), (8) and (10) as shown in FIG. 2-C.

The hopper or bulk container (16) in FIG. 3, contains a number of cutouts (20) that define the location and quantity of feed stations (4). Bolt holes are drilled on the periphery of bulk container (16) approximately 60 degrees from the station cutouts (20), to attach three or more legs (17) to bring the feed stations to any desired height.

"Eyebrows" or rain shields (18) in FIG. 3, are inserted into the access cutouts (20) in the bulk container (16) from the inside and secured by rivets or bonded in place.

The assembly shown FIG. 2-C is inserted into the hopper or bulk container (16) which locates the assembly feed pockets in the proper location by virtue of the bolt head clearance recesses (15).

The inventor submits at least the following benefits in regard to a feeder system in accordance with the present invention:

the flow and shape of a deposit of seeds, pellets or aggregate feeds can be formed and positioned for optimum animal or bird consumption by mated two piece vacuum molded plastic container inserts;

a single plastic base insert can be structured to support and distribute the weight of 500 lbs. of feed aggregate and provide multiple feed stations or horizontal or angled pockets which will minimize loss from overflow, contamination, and moisture;

the feed stations or pockets can be constructed to contain both large pellets or small seeds without overflow or containment lips, gates or moisture trapping recesses;

funnels or multiple funnels can control the position, shape and volume of the feed aggregate cone be forming the funnel opening into an oval, triangle or irregular geometric shape;

funnels or multiple funnels can control the volume and shape of the feed aggregate by forming the funnel opening at an angle or multiple angles in relation to the feed station base; and the design use of two piece plastic vacuum molded components, where the base components weight bearing structure, contains single or multiple feed stations which when mated with a vacuum molded single or multiple funnel component, provides a protected feed station or stations—a design integrated assembly by means of a shaped and angled funnel opening in conjunction with a formed wall and sloped floor base enclosure, provide a protected feed station or stations optimized for game accessibility with minimum waste and capable of using a variety of feed types.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A static feeder system for distributing feed aggregate to animals and birds, the system comprising:

a funnel component receiving feed aggregate in a top portion thereof and funneling the feed aggregate through an orifice at a bottom portion;

a base plate located beneath the orifice of said funnel component, said base plate being operable to support the feed aggregate as the feed aggregate falls through the orifice, wherein said base plate comprises an inclined side opposite to a non-inclined side, the inclined side being operable to force the feed aggregate towards and onto the non-inclined side.

2. A static feeder system as set forth in claim 1, wherein the orifice is elongated toward the non-inclined side of said base plate.

3. A static feeder system as set forth in claim 1, wherein the inclined side of said base plate is formed to at least partially coincide with the shape of the orifice in the direction of the inclined side of said base plate.

4. A static feeder system as set forth in claim 3, wherein the formed portion of the inclined side of said base plate is in contact with a bottom portion of the orifice to prevent feed aggregate from spilling over the inclined side of said base plate.

5. A static feeder system as set forth in claim 1, wherein the inclined side of said base plate is inclined approximately 20 to 30 degrees relative to the non-inclined side.

6. A static feeder system as set forth in claim 1, wherein the inclined side of said base plate begins its inclination at a location corresponding to the center of the orifice or in front of the center of the orifice, toward the non-inclined side of said base plate.

7. A static feeder system as set forth in claim 1, wherein the orifice is triangular in shape to force the feed aggregate toward each of two lateral sides of the non-inclined side of said base plate.

8. A static feeder system as set forth in claim 1, wherein a bottom portion of the orifice is sloped downward toward the inclined side of said base plate.

9. A static feeder system for distributing feed aggregate to animals and birds, the system comprising:

a funnel component receiving feed aggregate in a top portion thereof and funneling the feed aggregate through an orifice at a bottom portion of said funnel component; and a base plate located beneath the orifice of said funnel component, said base plate being operable to support the feed aggregate as the feed aggregate falls through the orifice, wherein said base plate comprises an inclined side opposite to a non-inclined side, the inclined side being operable to force the feed aggregate towards and onto the non-inclined side, wherein further, an opening of the orifice is shaped to force the feed aggregate toward both of two lateral sides of the non-inclined side of said base plate and a bottom portion of a guiding portion of the orifice is sloped downward toward the inclined side of said base plate to reduce an amount of feed aggregate from spilling over the inclined side of said base plate.

10. A static feeder system for distributing feed aggregate to animals and birds, the system comprising:

a multi-channel funnel component having a number of funnels receiving feed aggregate in a top portion thereof and funneling the feed aggregate through a corresponding number of orifices at a bottom portion; and a structural base component comprising a plurality of partitions, each partition comprising;

a curved funnel located beneath and corresponding to at least one orifice of said multi-channel funnel component; and an inclined base portion opposite to a non-inclined base portion, the inclined base portion being operable to force the feed aggregate towards and onto the non-inclined base portion.

11. A static feeder as set forth in claim 10, wherein the multi-channel funnel component and the structural base component are each made from a single corresponding piece of material.

12. A static feeder as set forth in claim 10, wherein the multi-channel funnel component and the structural base component are each vacuum molded from a single corresponding piece of plastic.

13. A static feeder as set forth in claim 10, wherein each orifice is elongated toward the non-inclined base portion of its corresponding partition of said structural base component.

14. A static feeder as set forth in claim 10, wherein the inclined base portion of each of said partitions is formed to at least partially coincide with the shape of its corresponding orifice in the direction of the inclined base portion of the partition.

15. A static feeder as set forth in claim 10, wherein the inclined base portion of each partition is inclined approximately 20 to 30 degrees relative to its corresponding non-inclined base portion.

16. A static feeder as set forth in claim 10, wherein the inclined base portion of each of the partitions begins its inclination at a location corresponding to the center of its corresponding orifice, or in front of the center of the orifice, toward the non-inclined base portion of its corresponding partition.

17. A static feeder as set forth in claim 10, wherein each orifice is triangular in shape to force its respective feed aggregate toward each of two lateral sides of the non-inclined base portion of its corresponding partition of said structural base component.

18. A static feeder as set forth in claim 10, wherein a bottom portion of each orifice is sloped downward toward the inclined base portion of its corresponding partition of said structural base component.

19. A static feeder as set forth in claim 10, further comprising:

a bulk container operable to store a large quantity of feed aggregate, wherein said multi-channel funnel component and said structural base component are pressure fitted into said bulk container at a lower portion thereof and the stored feed aggregate is gravity-fed to each funnel of said multi-channel funnel component.

20. A static feeder as set forth in claim 19, wherein said bulk container comprises a plurality of openings in a sidewall thereof, wherein each opening is directly adjacent to a respective non-inclined base portion of said structural base component and wherein further, the feed aggregate forced toward the non-inclined base portion is easily accessed through each of the plurality of openings.

21. A static feeder as set forth in claim 20, wherein said bulk container further comprises at least one eyelid structure over a corresponding opening to prevent any contaminants from entering the opening.

22. A static feeder as set forth in claim 20, wherein said bulk container is capable of holding and supporting at least 500 pounds of feed aggregate.

* * * * *